(12) United States Patent
Witte

(10) Patent No.: US 8,861,154 B2
(45) Date of Patent: Oct. 14, 2014

(54) RECLOSER DEVICE AND METHOD OF OPERATION

(75) Inventor: John Witte, Washingtonville, NY (US)

(73) Assignee: Consolidated Edison Company of New York, Inc., New York, NY (US)

( * ) Notice: Subject to any disclaimer, the term of this patent is extended or adjusted under 35 U.S.C. 154(b) by 89 days.

(21) Appl. No.: 13/529,218

(22) Filed: Jun. 21, 2012

(65) Prior Publication Data

US 2012/0327545 A1 Dec. 27, 2012

Related U.S. Application Data

(60) Provisional application No. 61/499,327, filed on Jun. 21, 2011.

(51) Int. Cl.
| | |
|---|---|
| *H02H 3/07* | (2006.01) |
| *H02H 3/00* | (2006.01) |
| *H02H 3/24* | (2006.01) |
| *H02H 3/06* | (2006.01) |
| *H01H 83/00* | (2006.01) |
| *H02H 7/26* | (2006.01) |
| *H02H 3/02* | (2006.01) |

(52) U.S. Cl.
CPC .................. *H02H 7/262* (2013.01); *H02H 3/24* (2013.01); *H02H 3/063* (2013.01); *H01H 83/00* (2013.01); *H02H 3/02* (2013.01)
USPC ............................................... 361/71; 361/72

(58) Field of Classification Search
USPC ...................................................... 361/71, 72
See application file for complete search history.

(56) References Cited

U.S. PATENT DOCUMENTS

| | | | | |
|---|---|---|---|---|
| 4,307,380 | A * | 12/1981 | Gander .................... | 340/538.11 |
| 4,454,556 | A * | 6/1984 | DePuy ........................... | 361/73 |
| 4,600,962 | A | 7/1986 | Bliehall | |
| 4,724,391 | A * | 2/1988 | Blahous ....................... | 324/424 |
| 5,099,145 | A | 3/1992 | Higasa et al. | |
| 6,721,671 | B2 * | 4/2004 | Roberts ........................... | 702/58 |
| 2002/0133304 | A1 * | 9/2002 | McClure et al. ............... | 702/58 |
| 2006/0044157 | A1 | 3/2006 | Peters et al. | |
| 2010/0036538 | A1 * | 2/2010 | Stergiou et al. .............. | 700/292 |
| 2010/0161151 | A1 * | 6/2010 | Yang et al. .................... | 700/297 |

* cited by examiner

*Primary Examiner* — Scott Bauer

(74) *Attorney, Agent, or Firm* — Cantor Colburn LLP

(57) ABSTRACT

A device for interrupting the flow of electrical power in an electrical distribution system is provided. The device includes a sensor operably coupled to the electrical distribution system. A switching mechanism is coupled to the electrical distribution system, the switching mechanism movable between an open position and a closed position. A controller operably coupled to the sensor and the switching mechanism, the controller having a processor that is responsive to executable computer instructions when executed on the processor incrementing a first counter in a first mode of operation and a second counter in a second mode of operation. Wherein the processor is further responsive to executable computer instructions for switching from the first mode to the second mode in response to a signal from the sensor.

20 Claims, 15 Drawing Sheets

RECLOSER DEVICE AND METHOD OF OPERATION

This application is a non-provisional patent application which claims the benefit of U.S. Provisional patent application 61/499,327 filed Jun. 21, 2012, the entire contents of which are incorporated herein by reference.

BACKGROUND OF THE INVENTION

The present invention relates generally to automatic loop ("autoloop") system for an electrical power distribution network and more particularly to an autoloop system that facilitates segmentation of the autoloop in the event of a fault.

Electrical utilities have a number of metrics that are used to track performance and customer satisfaction. These metrics, which include the system average interruption frequency index ("SAIFI"), the customer average interruption duration index ("CAIDI"), and for some utilities, the momentary average interruption frequency index ("MAIFI"). SAIFI measures the average number of interruptions that a customer would experience during a time period, such as a year. CAIDI measures the duration of the interruption that a customer would experience, and is generally a few hours per year. MAIFI measures the number of power interruptions that have a duration of less than five minutes that a customer would experience during a given time period.

Some or all of these metrics are also used by government regulators to aid in determining if the electrical utility is adhering to the regulations in maintaining a durable and reliable electrical distribution network. As a result, electrical utility and distribution companies have developed system architectures that minimize the duration and frequency of power outages. One technique uses a device called an "autorecloser" or simply "recloser", in the protection scheme for the distribution system. A recloser is a type of circuit breaker that includes a mechanism that allows the circuit breaker to close or reconnect the electric circuit after an electrical fault is detected. The premise of the recloser is that many electrical faults on the overhead open wire system are transitory, due to issues such as a tree limb touching or falling on a power line for example. The recloser includes a controller that is programmed to make several attempts to reconnect before locking open the recloser. Generally, the feeder recloser is programmed with an operating profile that provides for one "fast" trip and one to three "slow" trips before finally locking open.

Another technique used to improve performance is to arrange the electrical circuits in what is commonly referred to as an autoloop system. In an autoloop, the distribution network is divided into two or more branch circuits that can be adaptively coupled in the event of a failure. Generally, a substation will provide two or more feeder branch circuits to a typical autoloop. A feeder recloser is positioned at the beginning of the circuit and provides the protection functionality discussed above. A second recloser is positioned at an intermediate position along the branch circuit. The second recloser may be a "midpoint" type recloser that opens in response to a down stream fault. In addition or in place of the midpoint recloser, the system may include a sectionalizing recloser that opens in response to a downstream fault or may open in response to a loss of voltage. Positioned at the end of the branch circuit is a third type of recloser known as a "tie" recloser. The tie recloser couples the branch circuit with a similarly configured adjacent branch circuit. A sectionalizing recloser is different from a tie recloser in that a sectionalizing recloser will open in response to a fault that occurs downstream under normal current flow condition. A sectionalizing recloser will also open after a predetermined amount of time following a loss of voltage.

The tie recloser is normally in an open position to prevent the flow of electrical current between the branch circuits. In the event of a fault between the feeder and midpoint that the feeder recloser cannot clear, the feeder recloser locks open and results in a loss of potential on the entire branch circuit. When this occurs, the midpoint recloser changes settings to trip/open at a lower current level and lock open after only one trip. The tie recloser is arranged to automatically close at short period of time, typically 15 to 100 seconds, upon the detection of the loss of voltage potential. When the tie recloser connects the two branch circuits, electrical current can flow into the branch circuit with the electrical fault. Depending on where the fault is located on the branch circuit, partial electrical service can be restored to the portion of the branch circuit that experienced the failure. For example, if the fault occurs between the feeder recloser and the midpoint recloser, when the tie recloser connects the circuits, electrical power flows into the branch circuit. Since the fault is still present, the midpoint recloser trips and locks open. However, electrical power is still available for the customers between the sectionalizer/midpoint recloser and the tie recloser. Thus the average duration of electrical power loss and the amount of affected customers are minimized.

It should be appreciated that the when the tie recloser closes to flow electrical power into the adjacent branch circuit, the electrical power will flow through the sectionalizing/midpoint recloser in the opposite direction from normal operation. As a result, the sectionalizing/midpoint recloser may react differently than desired to subsequent faults. Further, it is desirable to increase the amount of fault isolating devices on a circuit to reduce the amount of customers that are without power. However, the more devices that are included in a circuit, the more difficult it is to obtain a desired level of coordination between the devices. It has been found that on some circuits, the number of devices may not be increased without resorting to difficult and expensive communications schemes or extensive redesign of the circuit.

Thus, while existing electrical distribution systems are suitable for its intended purpose, there remains a need for improvements; particularly regarding the operation and coordination of devices in an autoloop system to increase the number of isolating devices on a given circuit to reduce the number of customers that lose electrical power during an outage.

SUMMARY OF THE INVENTION

In accordance with one embodiment of the invention, a device for interrupting a flow of electrical power in an electrical distribution system is provided. The device includes a sensor operably coupled to the electrical distribution system. A switching mechanism is coupled to the electrical distribution system, the switching mechanism movable between an open position and a closed position. A controller is operably coupled to the sensor and the switching mechanism, the controller having a processor that is responsive to executable computer instructions when executed on the processor incrementing a first counter in a first mode of operation and a second counter in a second mode of operation. Wherein the processor is further responsive to executable computer instructions for switching from the first mode to the second mode in response to a signal from the sensor.

In accordance with another embodiment of the invention, another device for interrupting a flow of electrical power in an electrical distribution system is provided. The device includes a sensor operably coupled to the electrical distribution system. A switching mechanism is coupled to the electrical distribution system, the switching mechanism movable between an open position and a closed position. A user selectable switch is provided, the user selectable switch being movable between a first position and a second position. A controller is operably coupled to the sensor, the switching mechanism and the user selectable switch, the controller having a processor that is responsive to executable computer instructions when executed on the processor incrementing a first counter in a first mode of operation and a second counter in a second mode of operation. The processor is further responsive to executable computer instructions for switching from the first mode to the second mode in response to a signal from the sensor. Wherein when the user selectable switch is in the second position, the processor is further responsive to executable computer instructions for moving the switching mechanism from the closed position to the open position in response to a detection of a fault condition on the electrical distribution system.

In accordance with another embodiment of the invention, a method of operating a recloser device on an electrical distribution network is provided. The method includes the steps of activating a first counter setting and monitoring the electrical distribution network. A first electrical fault is detected on the electrical distribution network. The first counter is incremented in response to detecting the first electrical fault. If the first counter is determined to be equal to the first counter setting a switching mechanism is opened. A loss of voltage is detected on the electrical distribution network. A second counter setting is activated in response to the detecting of the loss of voltage.

BRIEF DESCRIPTION OF THE DRAWINGS

Referring now to the drawings, which are meant to be exemplary and not limiting, and wherein like elements are numbered alike.

DETAILED DESCRIPTION

Embodiments of the present invention provide for a sectionalizing device having a counting feature for electrical network circuits where coordination of automation devices is difficult or impossible. The counter device may be a passive device in which it may be installed on a given coordinated device circuit while reducing or minimizing the reconfiguration of coordination of the circuit. The number of trip and recloses of tripping/interrupting devices on the circuit may change, but the coordination of the existing devices would not be effected. The counter device may further have features that allow for operation with communications and Supervisory Control and Data Acquisition (SCADA) systems as well as advanced system control logic. The counter device may also have the capability to be autonomous in the field without the need of communication with other devices or control systems to operate. In some embodiments, the counter device may operate with a restrictive set of operating rules, so it only operates for a desired scenario. The operating rules provide advantages in keeping the counter device from operating incorrectly or unexpectedly during other system events that may occur on an electrical network circuit.

Figure 1:
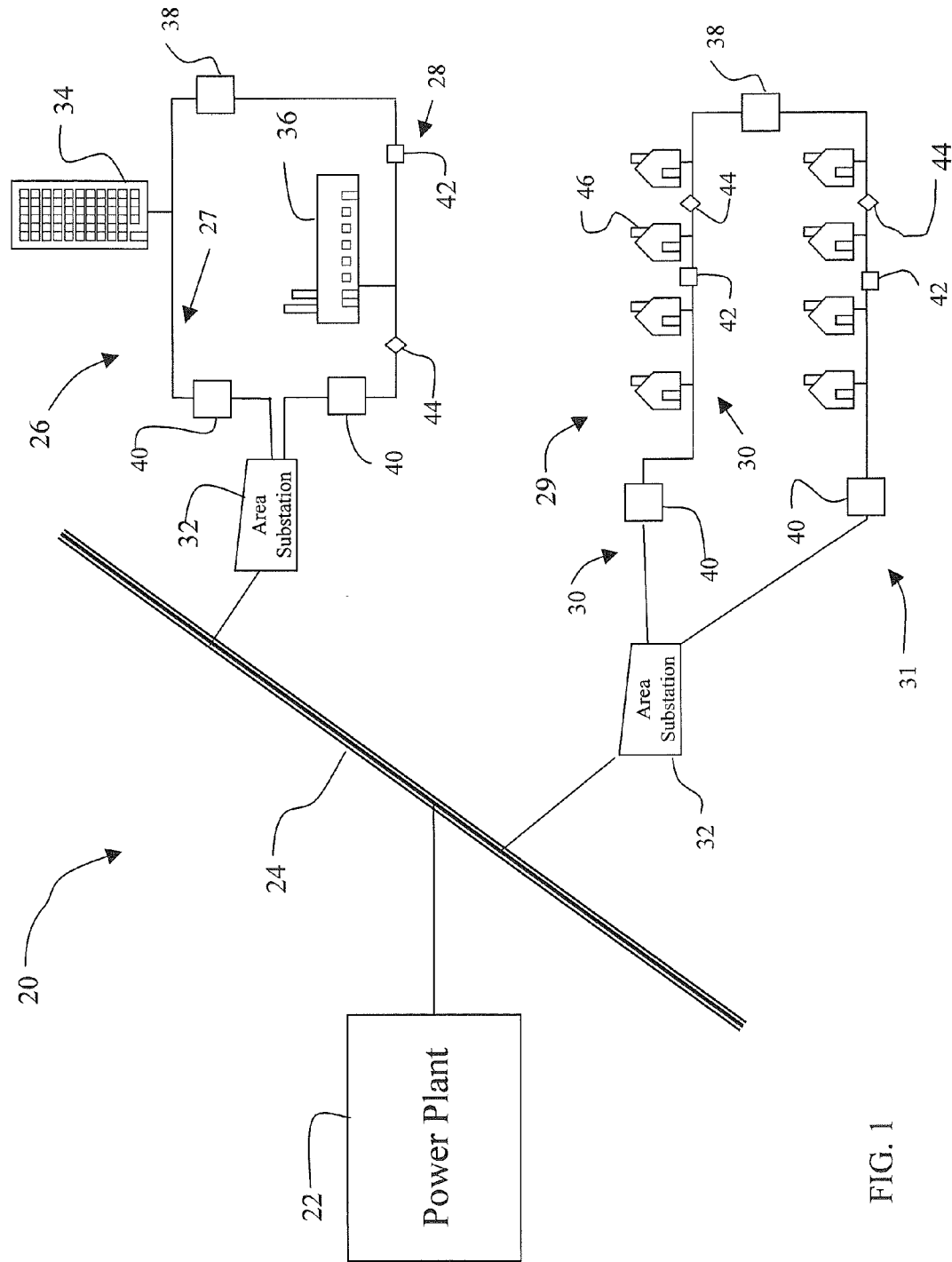
FIG. 1 is a schematic illustration of a utility electrical distribution system.

FIG. 1 illustrates an exemplary embodiment of a utility electrical distribution system 20. The utility system 20 includes one or more power plants 22 connected in parallel to a main transmission system 24. The power plants 22 may include, but are not limited to: coal, nuclear, natural gas, or incineration power plants for example. Additionally, the power plant 22 may include one or more hydroelectric, solar, or wind turbine power plants for example. It should be appreciated that additional components such as transformers, switchgear, fuses and the like (not shown) may be incorporated into the utility system 20 as needed to ensure the safe and efficient operation of the system. The utility system 20 is typically interconnected with one or more other utility networks to allow the transfer of electrical power into or out of the electrical system 20.

The main transmission system 24 typically consists of high transmission voltage power lines, anywhere from 69 KV to 500 KV for example, and associated transmission and distribution equipment which carry the electrical power from the point of production at the power plant 22 to the end users located on local electrical distribution systems 26, 29. The local distribution systems 26, 29 are connected to the main distribution system by area substations 32 which reduce transmission voltage to distribution levels such as 13 KV, 27 KV or 33 KV. Area Substations 32 typically contain one or more transformers, switching, protection, and control equipment. Area Substations 32 all include circuit breakers to interrupt faults such as short circuits or over-load currents that may occur. Substations 32 may also include equipment such as fuses, surge protection, controls, meters, capacitors, and load tap changers for voltage regulation.

The area substations 32 connect to one or more local electrical distribution systems, such as local distribution autoloop system 26, for example, that provide electrical power to a commercial area having end users such as an office building 34 or a manufacturing facility 36. As will be discussed in more detail below, the area substation 32 typically has two or more feeder circuits that provide electrical power to different feeder circuit branches 27, 28 of the local distribution network 26. A connection between the two portions 27, 28 of the local distribution network 26 is maintained through a device referred to as a tie recloser 38. During normal operations, the tie recloser 38 remains "open" preventing the flow of electrical power between the local feeder branches 27, 28. The tie recloser 38 operates in conjunction with other circuit breakers or recloser devices 40 to form a radial automatic "autoloop" distribution system that improves performance of the utility system and minimizes the impact of a fault in one portion of the local distribution system.

The residential distribution system 29 includes one or more residential buildings 46 and light industrial or commercial operations. Similar to the commercial distribution network 26, the residential system 29 is divided into multiple branch feeders 30, 31 that are fed by the substation 32. Typically, the local distribution system 29 is arranged such that approximately up to 6 MVA of power is provided on each branch circuit of a five recloser autoloop for electrical loads such as residential buildings. Similar to the distribution autoloop 29, the branches 30, 31 are connected by a tie recloser 38 to form an autoloop. In addition to the tie recloser 38 and the feeder recloser 40, the local distribution network may include additional electrical control devices such as sectionalizing recloser 42 and remotely controlled counter reclosers 44. The electrical control devices 42, 44 allow the utility network to further isolate faults in the local distribution networks and minimize the number customer affected by the loss of power.

Figure 2:
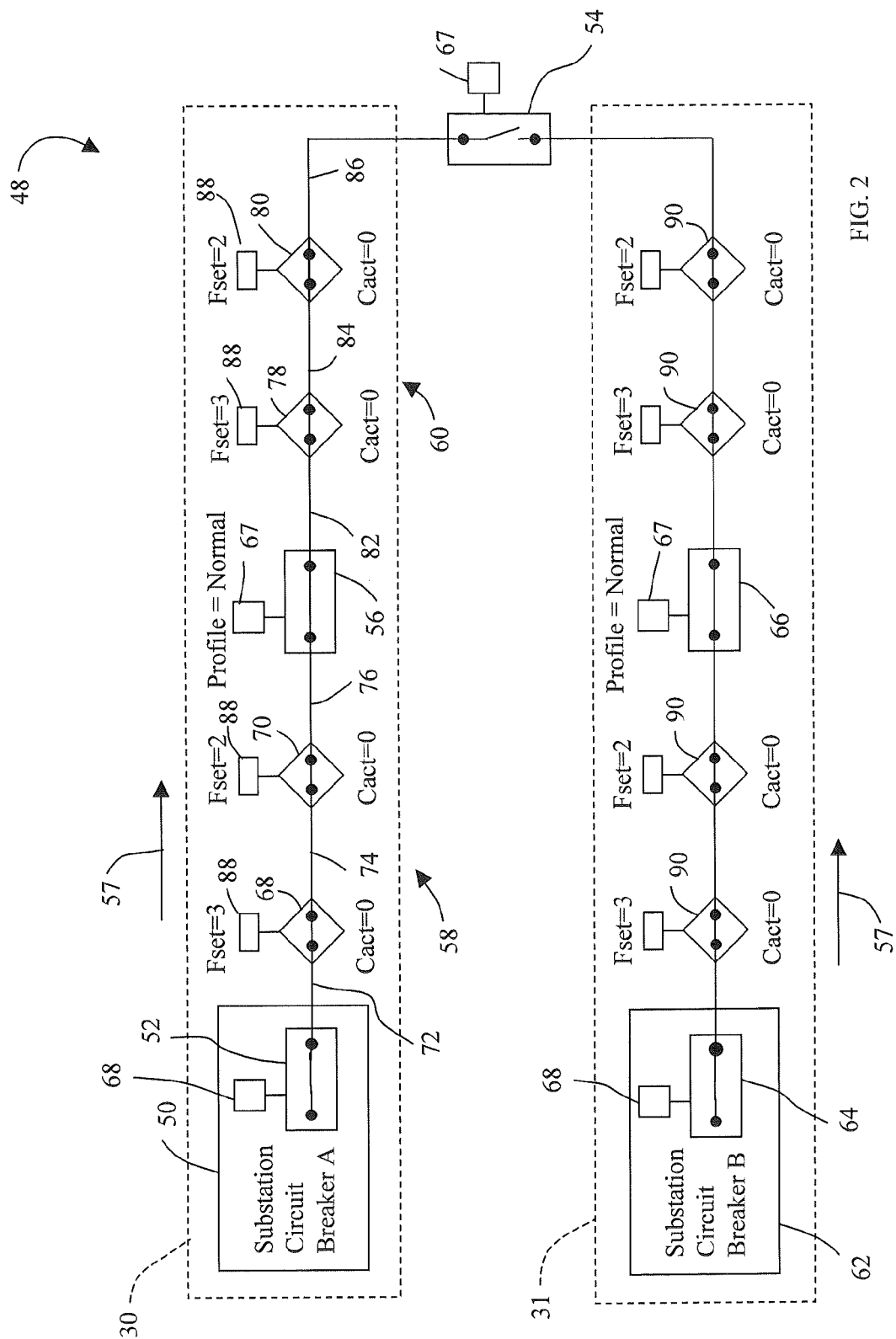
FIG. 2 is an schematic illustration of a portion of the electrical distribution system of FIG. 1 with two branch circuits configured as an autoloop.

Referring now to FIG. 2, an exemplary embodiment autoloop system 48 formed by the feeder branches 30, 31 is illustrated. In this embodiment, a first feeder 50 is located at the substation 32 to provide electrical power to the first branch circuit 30. A feeder recloser 52 is positioned to receive electrical power from the feeder 50 and transmit the electrical power to connected loads. As used herein, a recloser is a circuit breaker capable of interrupting electrical current to a protected circuit. The recloser further includes a mechanism that allows the recloser to automatically reclose after it has opened due to an electrical fault. The first branch circuit 30 terminates at a tie recloser 54. As discussed above, the tie recloser 54 remains open until the occurrence of an electrical fault in either the first branch circuit 30 or the second branch circuit 31. Between the feeder recloser 52 and the tie recloser 54 is a sectionalizing recloser 56. A sectionalizing recloser 56 is different from a tie recloser 54 in that a sectionalizing recloser 56 will open in response to a fault that occurs downstream under normal electrical current flow conditions (e.g. current flow in the direction indicated by arrow 57). It should be appreciated that electrical loads are connected to the first branch circuit 30 but are not illustrated here for the purpose of clarity. The reclosers 52, 54, 56 break the branch circuit 30 into segments 58, 60 that may be isolated in the event of an electrical fault.

Similar to the first branch circuit 30, the second branch circuit 31 includes a feeder 62 located at the substation 32. The feeder 62 provides electrical power to a feeder recloser 64. The second branch circuit 31 ends at the tie recloser 54 with a sectionalizing recloser 66 positioned in between.

Each of the reclosers 52, 54, 56, 64, 66 includes a controller 67 that provides command and control functionality for the recloser. The controller 67 may includes a communications device for transmitting and receiving data and instructions along a communications connection (not shown). It should be appreciated that the communications connection may be any suitable communications means, including wired or wireless, capable of quickly and reliably transmitting information. In one embodiment, the communications connection is a radio connection in the 900 MHz spectrums. The communications connection may also be a leased telecommunications line (e.g. X.25, T1), a fiber network, a PSTN POTS network, a DSL telecommunications line, a cable telecommunications line, a microwave connection, a cellular connection, or a wireless connection using the IEEE 802.1 standard.

The controller 67 may be any suitable control device capable of receiving multiple inputs and providing control functionality to multiple devices based on the inputs. Controller 67 include a processor that is a suitable electronic device capable of accepting data and instructions, executing the instructions to process the data, and presenting the results. Processor may accept instructions through a user interface, or through other means such as but not limited to electronic data card, voice activation means, manually-operable selection and control means, radiated wavelength and electronic or electrical transfer. Therefore, the processor can be a microprocessor, microcomputer, a minicomputer, an optical computer, a board computer, a complex instruction set computer, an ASIC (embodiment specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, or a hybrid of any of the foregoing.

The controller 67 may include storage devices such as read only memory (ROM), nonvolatile memory (NVM), and random access memory (RAM). The storage devices may comprise a magnetic, solid state, optical, or other storage media for storing embodiments, data, operating systems and other information. Controller 68 further includes operation control methods embodied in embodiment code, such as the method shown in FIG. 5 for example. These methods are embodied in computer instructions written to be executed by processor, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), PHP (hypertext preprocessor) and any combination or derivative of at least one of the foregoing. Additionally, an operator can use an existing software embodiment such as a spreadsheet or database and correlate various cells with the variables enumerated in the algorithms. Furthermore, the software can be independent of other software or dependent upon other software, such as in the form of integrated software.

Figure 7:
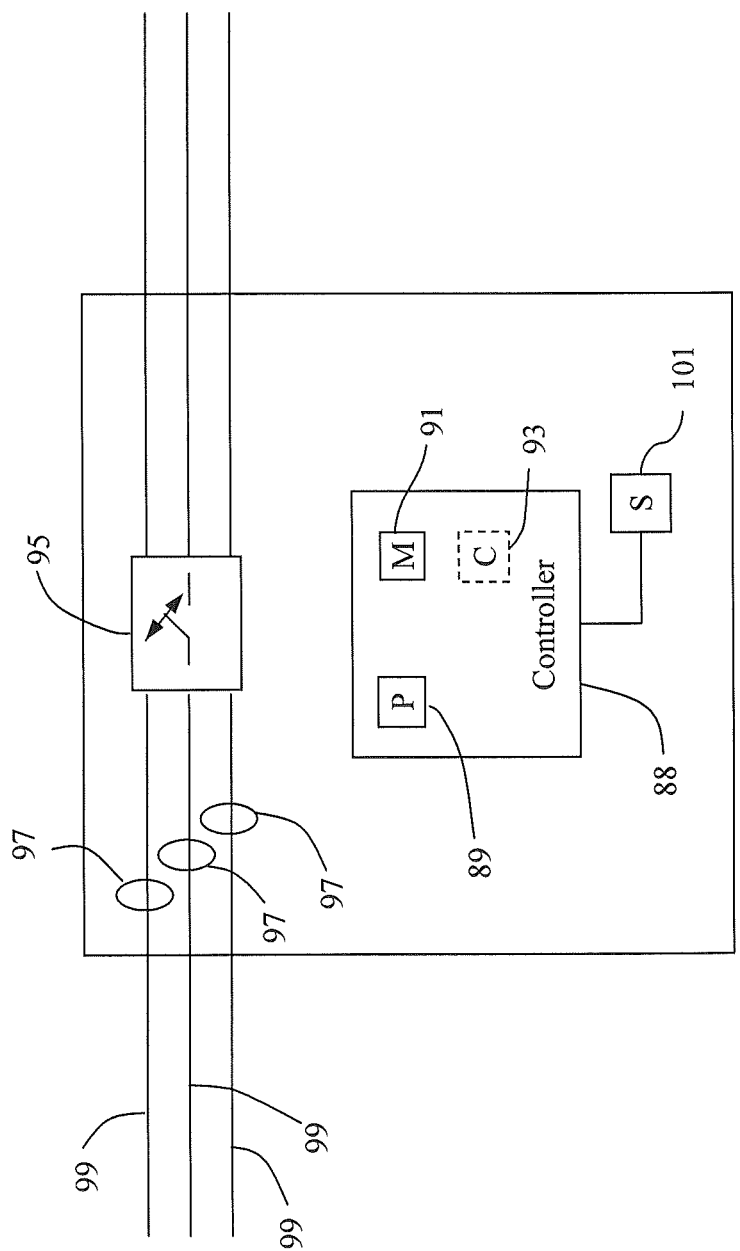

In the exemplary embodiment, the autoloop system 48 will also include one or more counter reclosers. In the first branch circuit 30, there may be two counter reclosers 68, 70 between the sectionalizing recloser 56 and the feeder recloser 52. These counter reclosers 68, 70 further subdivide the segment 58 into a first segment 72, a second segment 74, and a third segment 76. There may be two further counter reclosers 78, 80 coupled between the sectionalizing recloser 56 and the tie recloser 54. The counter reclosers 78, 80 further subdivide the segment 60 into a fourth segment 82, a fifth segment 84 and a sixth segment 86. As will be discussed in more detail herein, the counter reclosers are a recloser device having a switch 101 and switching mechanism 95 (FIG. 7) that stays closed until a predetermined criteria is satisfied. In one embodiment, the counter recloser may include multiple sensors, such as current transformers 97, with each associated with one or more of the electrical phases 99. In the exemplary embodiment, the predetermined criteria may be user defined to provide coordination between the devices. As used herein, the term "coordination" refers to configuring electrical protection devices, such as reclosers, circuit breakers and switches for example, to allow the devices closest to the fault to open, thus reducing the impact of the fault to those loads coupled to the segment where the fault occurs.

As will be discussed in more detail herein, the counter recloser can be configured for having a forward and reverse set of counters. The reverse counter is an option in the settings if this feature is desired. Each counter recloser counts when it sees fault current (e.g. current exceeds the minimum threshold/pickup setting) followed by a loss of three phase voltage (e.g. an upstream coordinated tripping device has tripped three electrical phases for this fault). The counter recloser will fulfill the predetermined logic when the amount of counts matches the number of predetermined counts set by the operator. When the counts match, the counter recloser will begin start an open timer and then open (e.g. interrupt the circuit) after the timer times-out/expires. The reverse counters may perform the same counter rules as the forward counters and have a predetermined reverse count setting to fulfill. The amount of counts in the counter may be determined by the fault tripping device upstream of it. If the upstream device trips four times to lockout, then the counter must be one less count or four minus 1. The counter may be set to 1 count before opening if there is no need for fusing down stream from the counter device.

Each of the counter reclosers includes a controller 88. The controller 88 may be any suitable control device capable of receiving multiple inputs and providing control functionality to multiple devices based on the inputs. In the exemplary embodiment, the counter reclosers may not have communications circuits 93 that allow for communications with external devices and operate autonomously. Controller 88 include a processor 89 that is a suitable electronic device capable of accepting data and instructions, executing the instructions to process the data, and presenting the results. Processor may accept instructions through a user interface, or through other means such as but not limited to electronic data card, voice activation means, manually-operable selection and control means, radiated wavelength and electronic or electrical transfer. Therefore, the processor can be a microprocessor, microcomputer, a minicomputer, an optical computer, a board computer, a complex instruction set computer, an ASIC (embodiment specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, or a hybrid of any of the foregoing.

The controller 88 may include storage devices 91 such as read only memory (ROM), nonvolatile memory (NVM), and random access memory (RAM). The storage devices may comprise a magnetic, solid state, optical, or other storage media for storing embodiments, data, operating systems and other information. Controller 88 further includes operation control methods embodied in embodiment code, such as the method shown in FIG. 5 for example. These methods are embodied in computer instructions written to be executed by processor, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), PHP (hypertext preprocessor) and any combination or derivative of at least one of the foregoing. Additionally, an operator can use an existing software embodiment such as a spreadsheet or database and correlate various cells with the variables enumerated in the algorithms. Furthermore, the software can be independent of other software or dependent upon other software, such as in the form of integrated software.

It should be appreciated that the second branch circuit 31 is similarly configured to the first branch circuit 30 and includes one or more counter reclosers 90. While for exemplary purposes, embodiments herein may refer to the operations of devices on the first branch circuit 30 in response to a fault, the claimed invention should not be so limited and the disclosed methods may be similarly performed by devices on the second branch circuit 31.

In the exemplary embodiment, each of the counter reclosers 68, 70, 78, 80 and the sectionalizing recloser 56 are configured to have a first operating mode and a second operating mode to provide for coordination in the event of a fault. The first operating mode shown is utilized when the branch circuits are operating normally as shown in FIG. 2, where the current flows from the feeder 50 in the direction indicated by arrow 57. In the first operating mode, the sectionalizing recloser 56 is configured to operate as described above to open in the event of a downstream fault. However, in the event of a loss of voltage, the sectionalizing recloser 56 switches to the second operating mode. The counter reclosers 68, 70, 78, 80 are configured to monitor for predetermined fault type conditions, such as a short circuit for example. When the predetermined number of faults is recorded within a predetermined amount of time (e.g. 2 minutes), the counter recloser opens. The number of fault events that a counter recloser may record before opening may be user-defined to allow for coordination of the devices in the auto loop 48. Each of the counter reclosers 68, 70, 78, 80 may monitor for a different number of fault events. In the exemplary embodiment shown in FIG. 2, the first counter recloser 68 has a first operating mode count setting (Fset) of three, the second counter recloser 70 has a count setting (Fset) of two, the third counter recloser 78 has a count setting (Fset) of three, and the fourth counter recloser 80 has a count setting (Fset) of two. These settings allow for coordination of the devices on the first branch circuit, including the feeder recloser 52 and the sectionalizing recloser 56, in the event of a fault occurs on any of the segments 72-76, 82-86 while the current is flowing in the direction indicated by arrow 57. As will be discussed in more detail herein, the count setting (Fset) is reset if no further faults are recorded within a predetermined amount of time (e.g. 2 minutes).

Figure 3A:
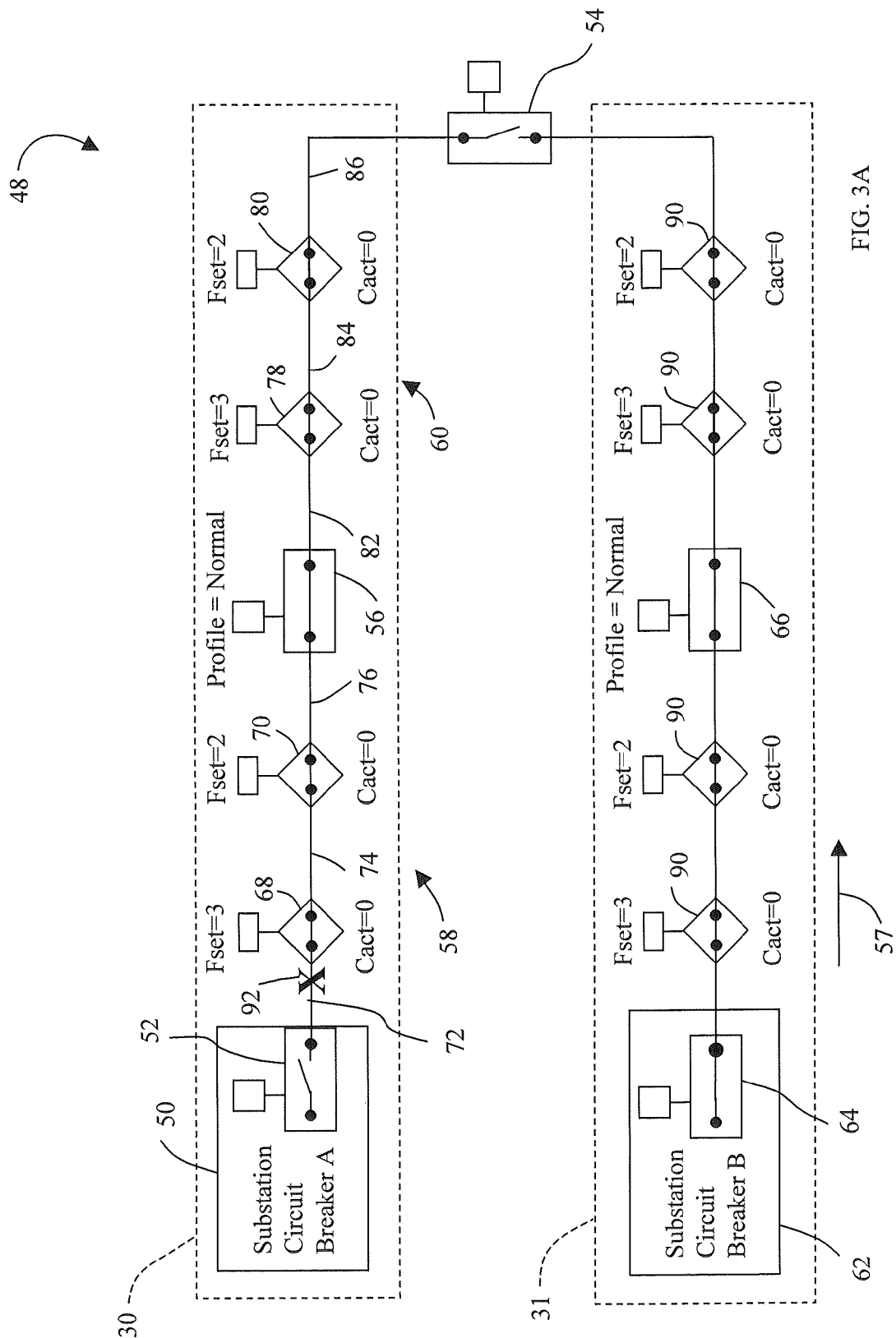
FIG. 3A-3C are schematic illustrations of an embodiment of the autoloop system of FIG. 2 in the event of a fault.
Figure 3B:
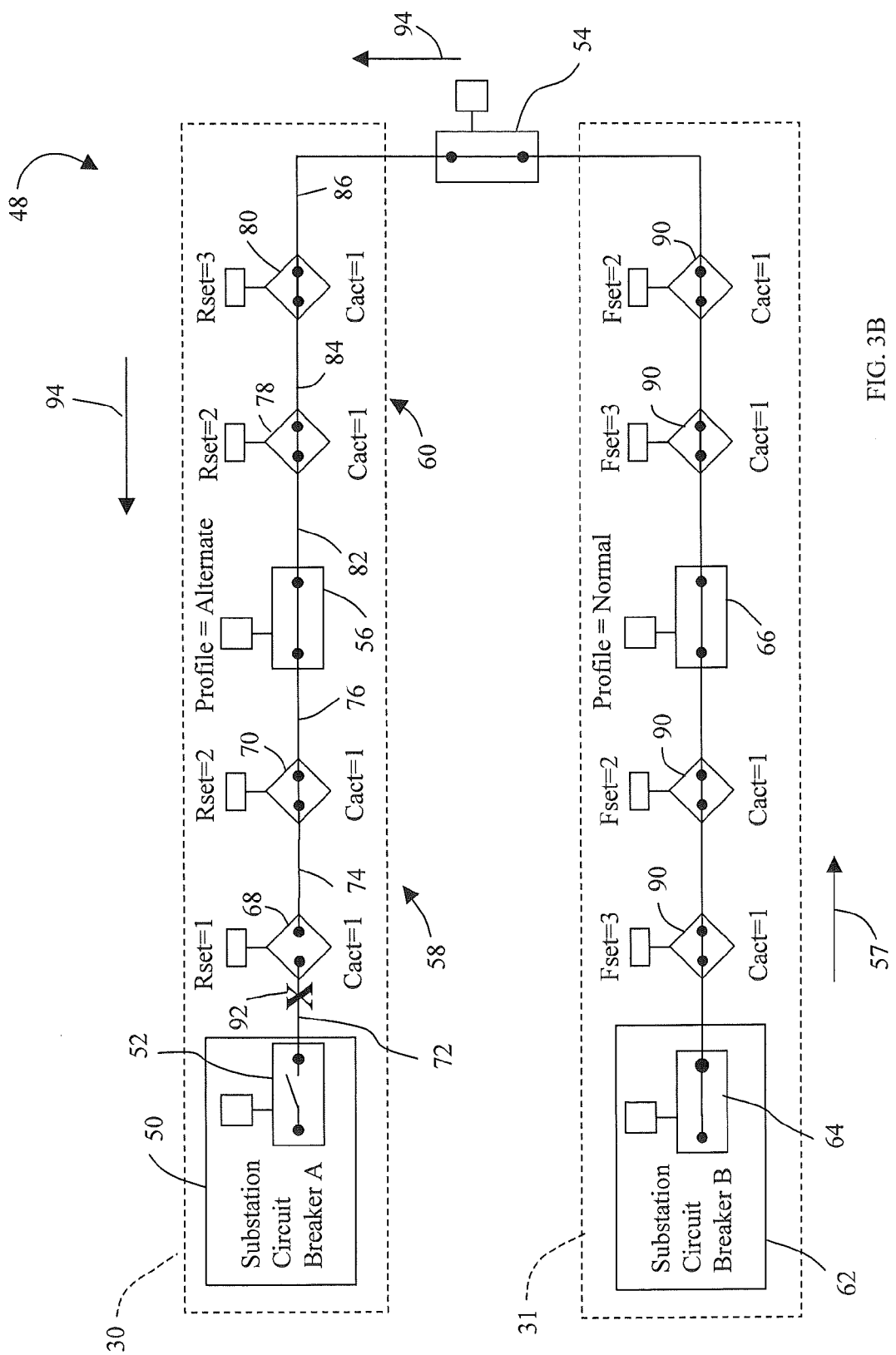

The counter reclosers 68, 70, 78, 80 are further configured to operate in a second operating mode. In the event of a loss of voltage, the counter reclosers 68, 70, 78, 80 initiate a timer. If the timer expires without voltage being restored, the counter reclosers 68, 70, 78, 80 switch from the first operating mode to the second operating mode. In the second operating mode, the counter reclosers 68, 70, 78, 80 switch to a second count setting (Rset) that allows for coordination of the devices on the first branch circuit 30 when once the tie recloser 54 closes allowing the flow of current from the second branch circuit 31 (FIG. 3B). In the embodiment of FIG. 2, the first counter recloser 68 has a reverse counter setting (Rset) of 1, the second counter recloser 70 has a reverse counter setting (Rset) of 2, the third counter recloser 78 has a reverse counter setting (Rset) of 2, and the fourth counter recloser 80 has a reverse counter setting (Rset) of 3.

In some embodiments, the counter reclosers 68, 70, 78, 80 may also have a third operating mode to provide for operation under desired fault scenarios and not operate for anything else. For fault conditions the counter reclosers 68, 70, 78, 80 are configured for, the counter recloser will open (e.g. interrupt the circuit) when voltage is not present. With the voltage not present, the counter logic is fulfilled. This mode of operation may also provide advantages in allowing the counter logic functionality to be used with other devices, such as but not limited to a sectionalizer device or motor-operated disconnect device.

Referring now to FIG. 2 and FIGS. 3A-3C, an example of the operation of autoloop 48 with a fault in the circuit segment 72 will be described. The autoloop 48 starts in a normal mode of operation with the current flowing from the first feeder recloser 52 through the branch circuit 30 in the direction indicated by arrow 57. Similarly, the second branch circuit 31 receives electrical power from the second feeder recloser 62. In the event of a fault 92 on the segment 72 (FIG. 3A), the first feeder recloser 52 will detect the fault due to the rapid rise of current flowing into the first branch circuit 30. The first feeder recloser 52 will attempt to clear the fault by reclosing. Once the first feeder recloser 52 has attempted to reclose a predetermined number of times (e.g. three), the first feeder recloser 52 will lock open causing a loss of voltage on the first branch circuit 30.

Figure 3C:
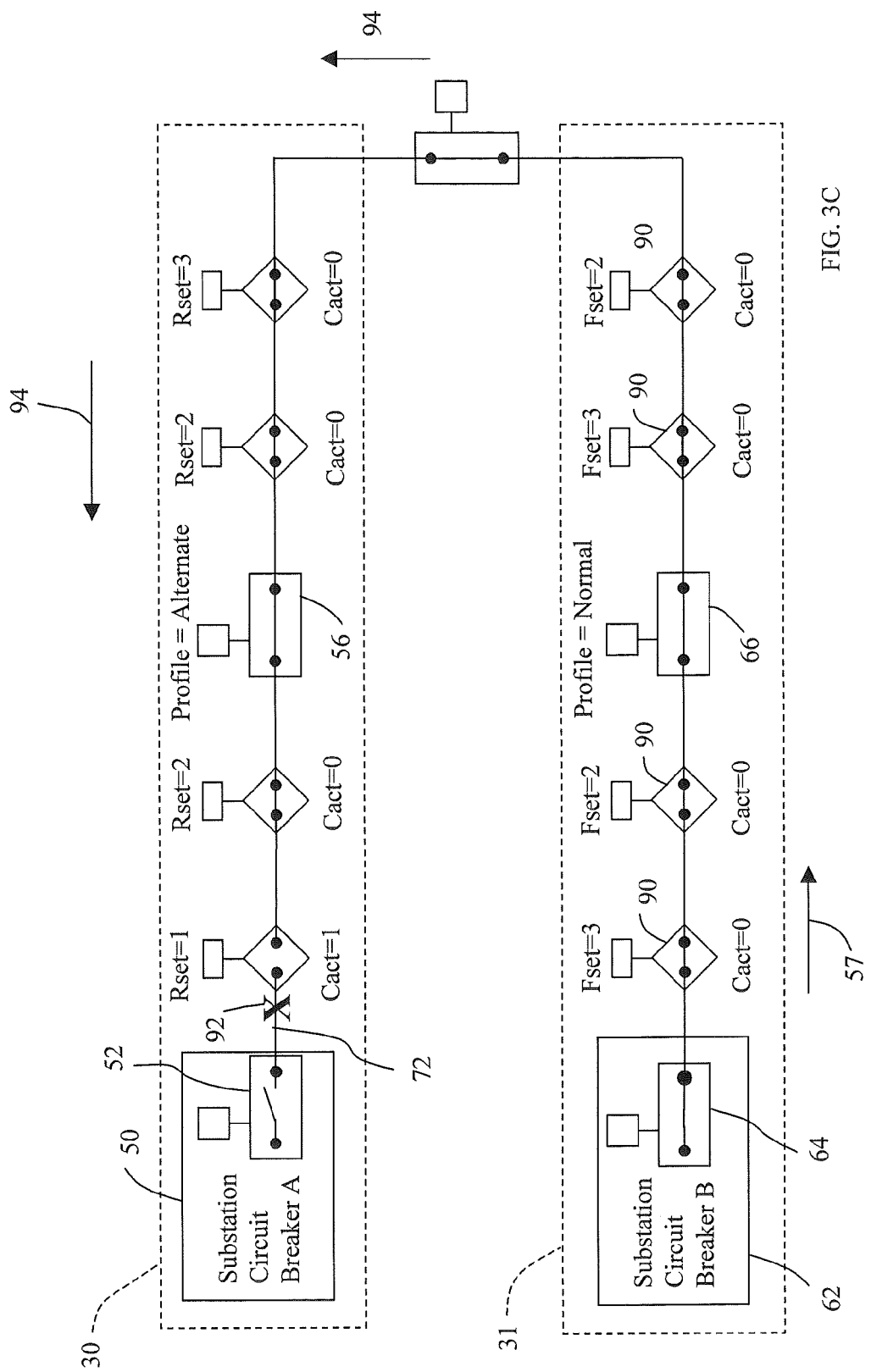

Once voltage is lost on the first branch circuit 30, the counter reclosers 68, 70, 78, 80, the sectionalizing recloser 56 and the tie recloser 54 will initiate timers. Upon expiration of the timers, the counter reclosers 68, 70, 78, 80 and the sectionalizing recloser 56 switch to their respective second operating mode (FIG. 3B) and the active count setting changes from Fset to Rset. Once the tie recloser 54 closes, electrical current will flow from the second branch circuit 31 into the first branch circuit as indicated by the arrow 94. With the electrical current flowing through the tie recloser 54, the first counter recloser 68 will detect the fault 92 that is downstream from the first counter recloser 68. The detection of the fault 92 will cause the counter reclosers 68, 70, 78, 80, 90 to increment the actual fault count (Cact). Since the first counter recloser 68 has a setting (Rset) of one, the first counter recloser 68 opens causing the segment 72 and the fault 92 to be isolated from the remainder of the autoloop 48 (FIG. 3B). Electrical current continues to flow from the second feeder recloser 64 through the second branch circuit 31 into the first branch circuit 30 up to the segment 74 until the desired repairs are made to correct the fault 94. Once a predetermined time period has passed (e.g. 2 minutes), the counter reclosers 70, 78, 80, 90 reset the actual fault count (Cact) back to zero (FIG. 3C). It should be noted here that the direction counter will not reset until the device is closed, three phase voltage is restored, and a current is below a predetermined threshold/pickup, this feature is enabled in settings and the power flow has returned to its normal configuration.

Referring now to FIG. 2 and FIGS. 4A-4D, another example of the operation of autoloop 48 with a fault in the circuit segment 72 will be described. The autoloop 48 starts in a normal mode of operation with the current flowing from the first feeder recloser 52 through the branch circuit 30 in the direction indicated by arrow 57. Similarly, the second branch circuit 31 receives electrical power from the second feeder recloser 62. In the event of a fault 96 on the segment 74 (FIG. 4A), the first feeder recloser 52 will detect the fault due to the rapid rise of current flowing into the first branch circuit 30.

Figure 4A:
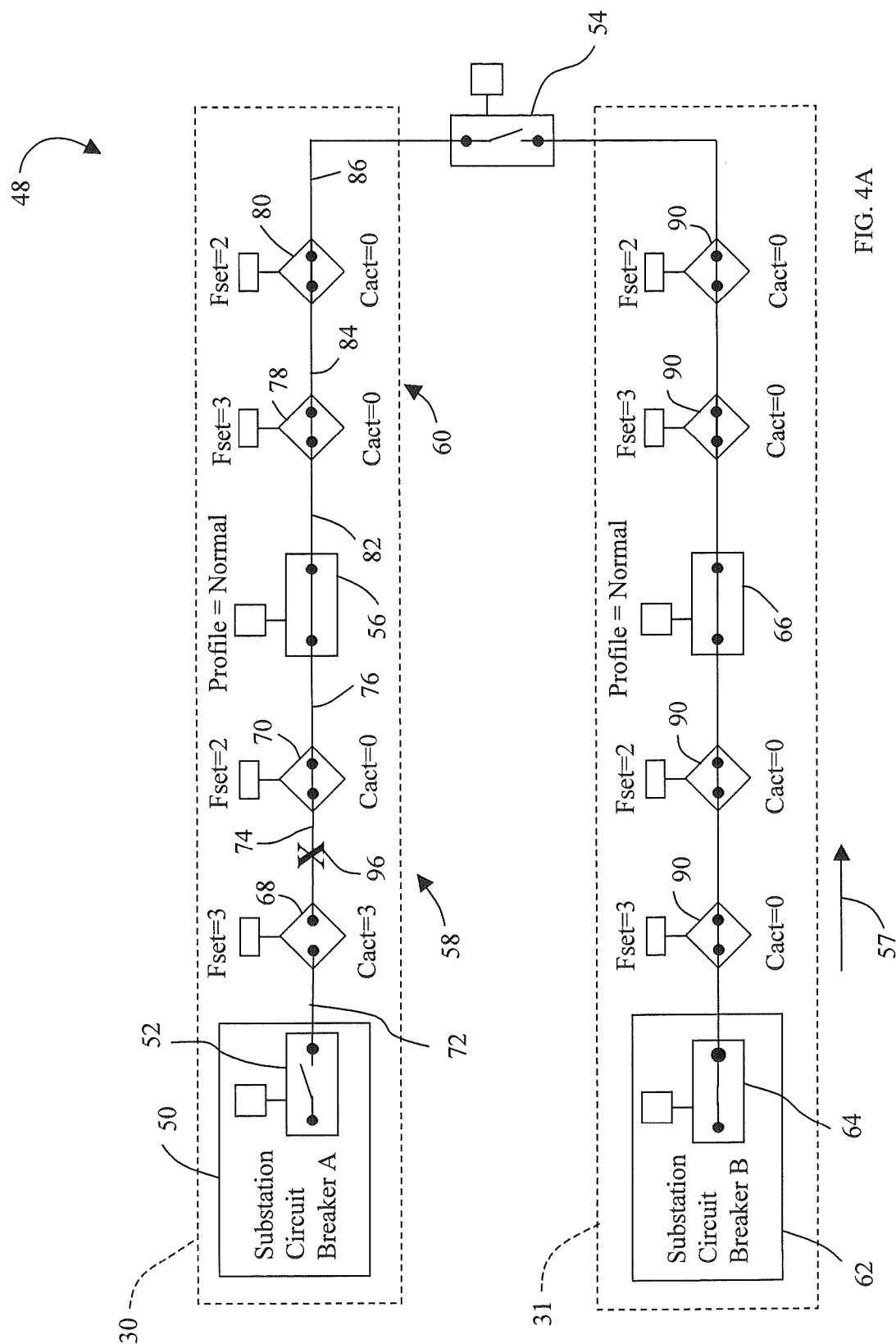
FIG. 4A-4D are schematic illustrations of the autoloop system of FIG. 2 in the event of another fault.
Figure 4B:
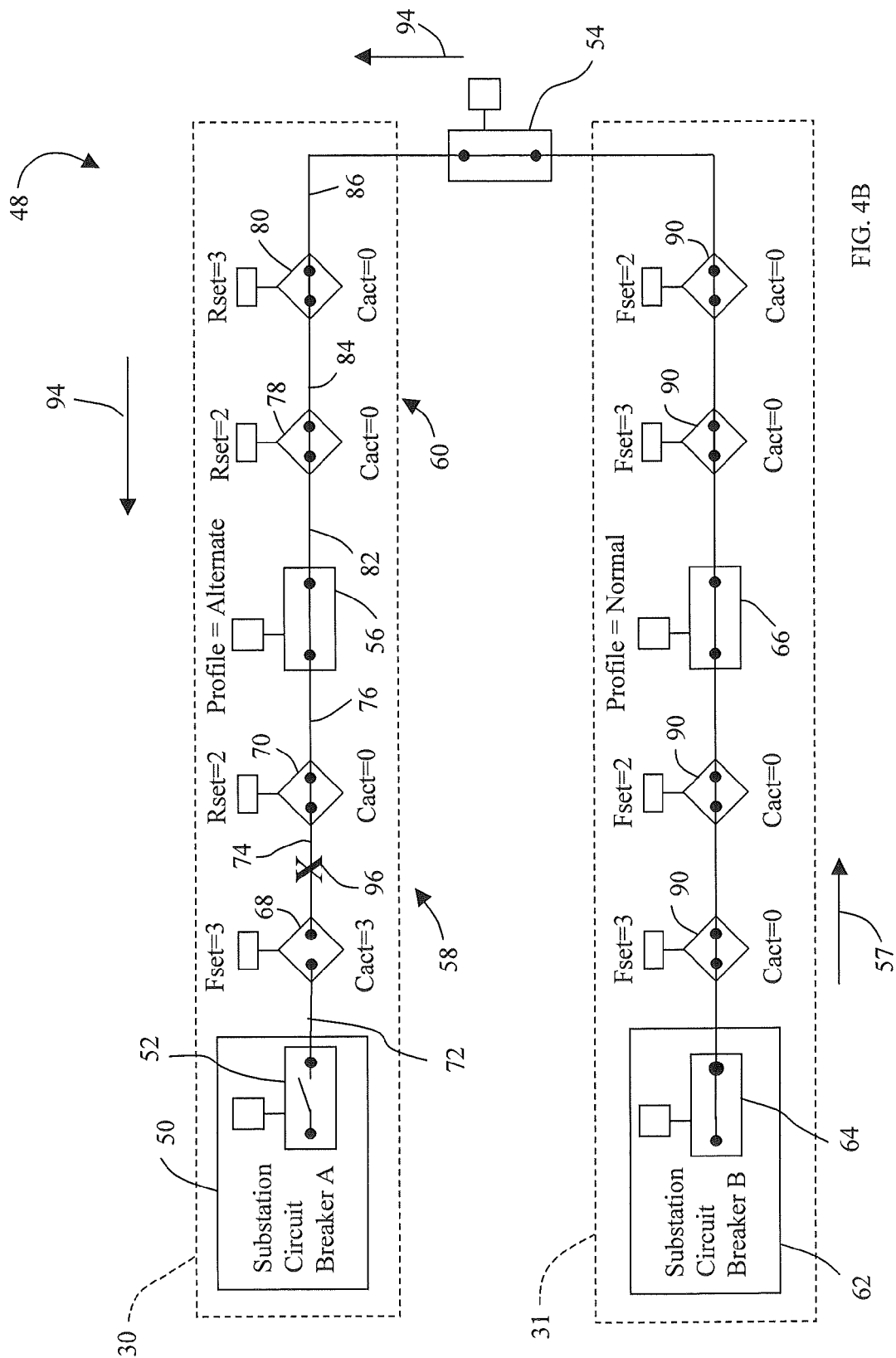

The first feeder recloser 52 will detect the fault 96 and will open and close in an attempt to clear or remove the fault from the first branch circuit 30. Each time the feeder recloser 52 closes allowing electrical current to flow into the first branch circuit 30, the first counter recloser 68 will detect the fault 96 and increment the actual fault counter (Cact). Once the actual fault counter (Cact) equals the predetermined forward counter setting (Fset), the first counter recloser 68 will open to prevent the flow of electrical current to the fault 96. It should be appreciated that the opening of the first counter recloser 68 results in a loss of voltage to the remaining downstream counter reclosers 70, 78, 80 and the sectionalizing recloser 56. As discussed above, upon the loss of voltage, the counter reclosers 70, 78, 80 and sectionalizing recloser 56 initiate a timer. Once the timers expire, if the voltage has not been restored, the device changes to the second mode of operation (FIG. 4B).

Figure 4C:
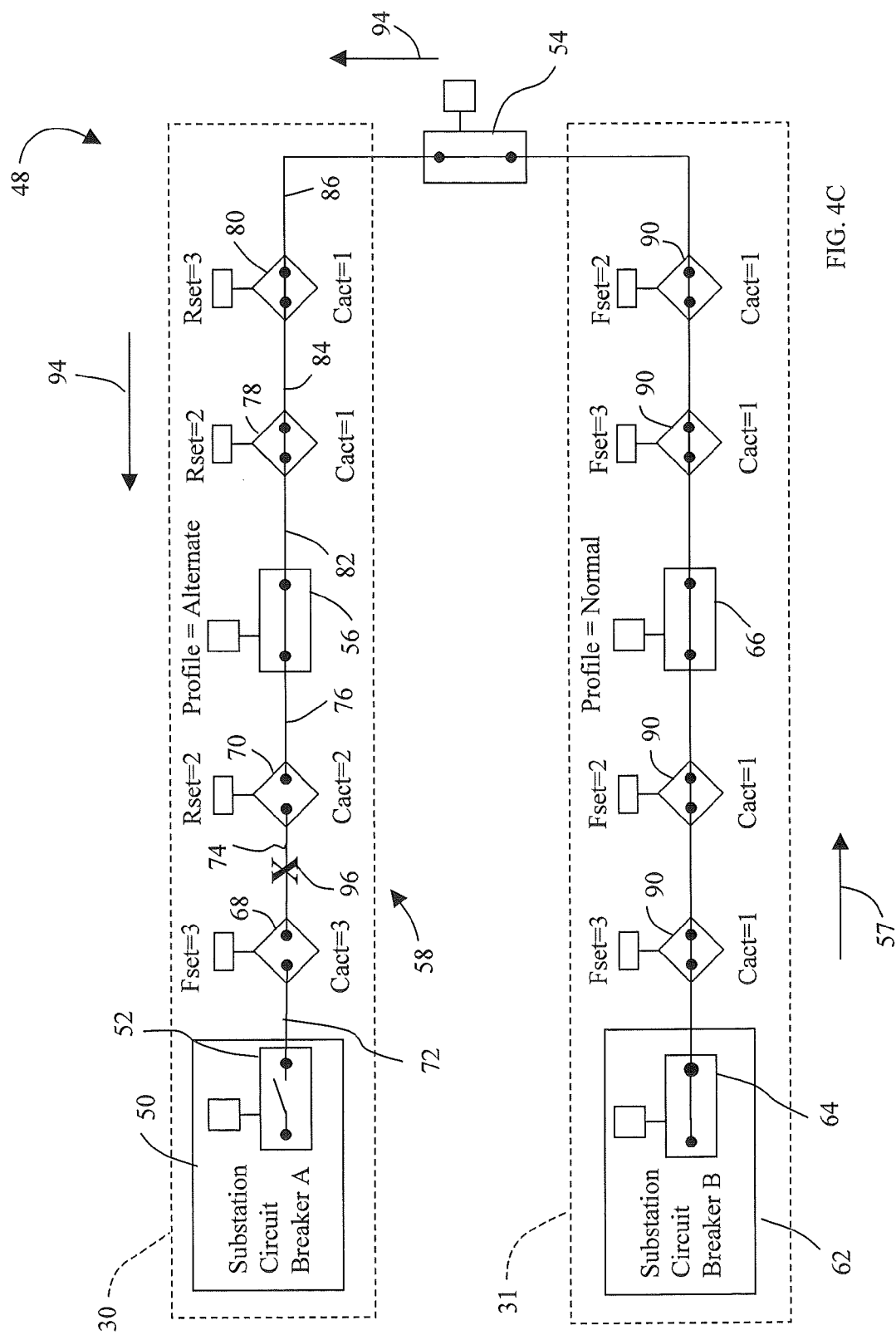
Figure 4D:
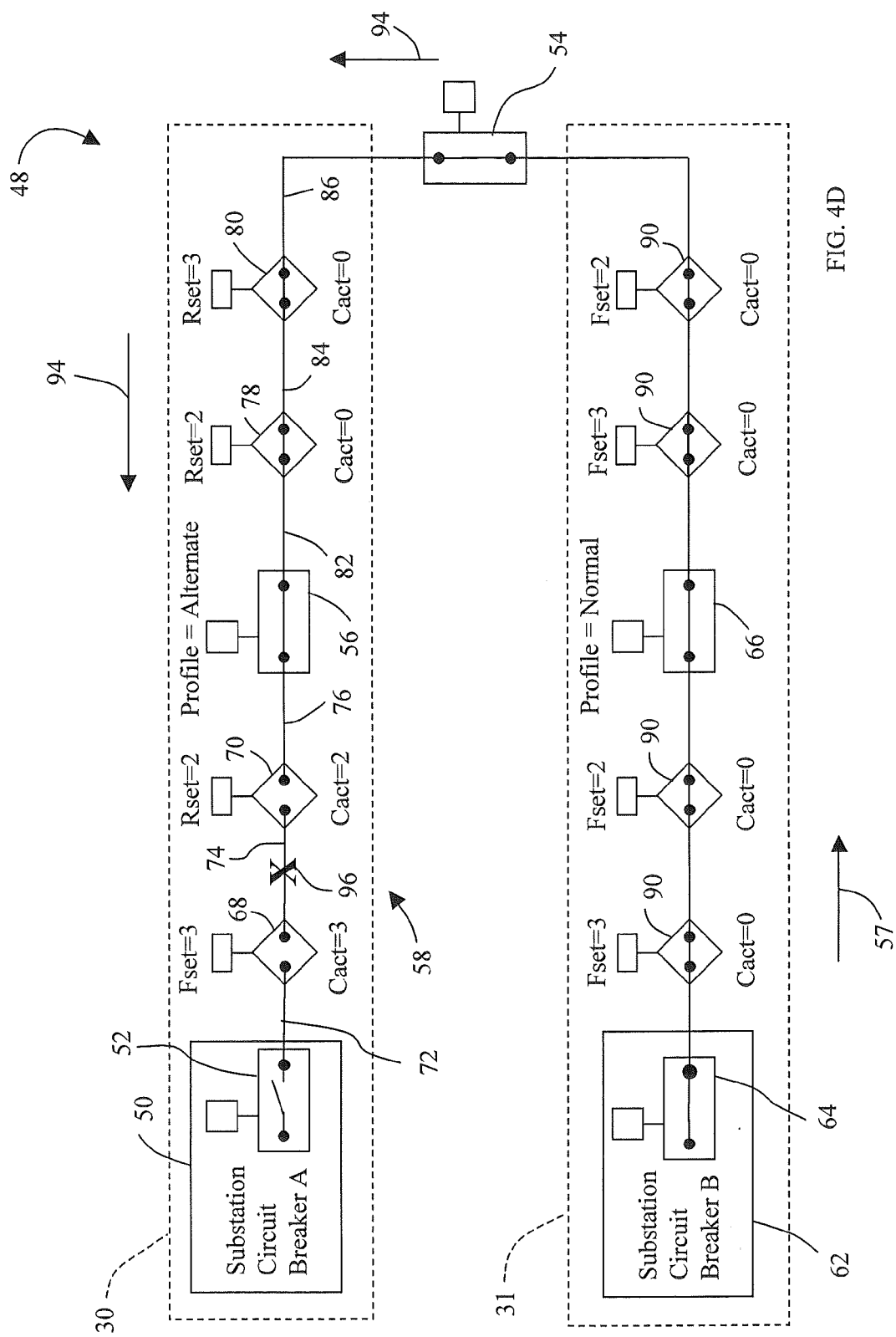

In the exemplary embodiments, the counter reclosers 68, 70, 78, 80 and sectionalizing recloser 56 are configured to switch from the first mode to the second mode prior to the tie recloser 54 closing. This allows the counter reclosers 68, 70, 78, 80 and sectionalizer recloser 56 to be in the correct configuration to respond when electrical current flows in the opposite direction as indicated by arrow 94. When the tie recloser 54 closes, the electrical current flows into the first branch circuit 30. Since the fault 96 still exists, the fault will be detected by second feeder recloser 64, which will instantaneously trip and reclose. This action by the second feeder recloser 64 causes a momentary loss of voltage on the second branch circuit 31 and the segments 76, 82, 84, 86 and each of the counter reclosers 70, 78, 80, 90 will increment the actual fault counter (Cact). After the second feeder recloser 64 closes, the sectionalizing recloser 56 will coordinate with the second feeder recloser 64. As a result, the sectionalizing recloser 56 will open and reclose since the fault 96 still exists. With the opening and reclosing of the sectionalizing recloser 56, the second counter recloser 70 detects the fault and increment the actual fault counter (Cact) to two (FIG. 4C). When the actual fault counter (Cact) equals the reverse counter setting (Rset), the second counter recloser 70 opens to isolate the fault 96 on the segment 74 (FIG. 4C). After a predetermined amount of time (e.g. 2 minutes) elapses without detecting a fault, the counter reclosers 78, 80, 90 reset their actual fault counters (Cact) to zero (FIG. 4D).

In the exemplary embodiment, the counter reclosers and sectionalizing reclosers are configured to operate autonomously and independent of communications with other devices or systems. To accomplish this, the counter and sectionalizing reclosers need to determine when it should be operational and when the counters should reset for further operations. In some instances, faults are temporary. The counter recloser may start counting for faults, but the fault may clear before the complete counter logic has been fulfilled. A set of timers and logic was created to determine what conditions will allow the counter to start over again. In some embodiments, the counter reclosers and sectionalizing reclosers may operate under the second operating mode until manually reset by utility personnel. In other embodiments, the controllers 67, 88 may have communications capability that allows them to be reset remotely. In still other embodiments, the counter functionality has been designed with reset timers, so the operating mode, the amount of counts, or a global reset if the device is back to a condition. As used herein, a "ready condition" is defined as a device that is closed, has three phase voltage and the current is lower than minimum pick up.

In still other embodiments, the counter recloser may be coupled via a communications link to a control or SCADA system. In this embodiment, a push to reverse mode feature may be used by an operator when it is desired to operate the device in the reverse direction when reverse counter settings are used. Via SCADA, the operator in a control center may transmit a signal to the counter recloser forcing the counter recloser into its reverse settings. This provides advantages in allowing the operator to manually change operating modes in response to a changing network configuration, such as when electrical power is provided from an alternate source.

It should be appreciated that the controllers 67, 68 for the feeder reclosers and sectionalizing reclosers may utilize different control methods to perform the desired operations. For example, the feeder reclosers 52, 64 may have an operational profile arranged to lock open after one "fast" and two "slow" trips. The "fast" and "slow" levels will depend on the desired response by the utility and generally refer to the amount of time the recloser takes to automatically close. As used herein, the term "profile" means a set of operating parameters, set points and operational methods, which define the response of the recloser. A profile may include parameters and set points such as but not limited to: current levels for tripping the recloser, the number and types of trips before locking open, and the time periods for tripping at different current levels for example. Once the feeder recloser locks open, all electrical current to the branch circuit is interrupted. One embodiment, the sectionalizing reclosers 56, 66 may change to a "reverse-mode" profile upon changing to the second mode of operation. In the "reverse-mode" operation, the midpoint recloser changes the tripping settings to coordinate in the reverse direction and lock open after one trip event.

It should be appreciated that the coordination between the feeder reclosers 52, 64, the sectionalizing reclosers 56, 66, the tie recloser 54, and the counter reclosers 68, 70, 78, 80, 90 may be achieved without direct communication between the individual devices or with an external controller. This provides advantages in providing coordination on an autoloop circuit between more devices and with less expense and at a higher reliability that could be achieved previously.

Figure 5:
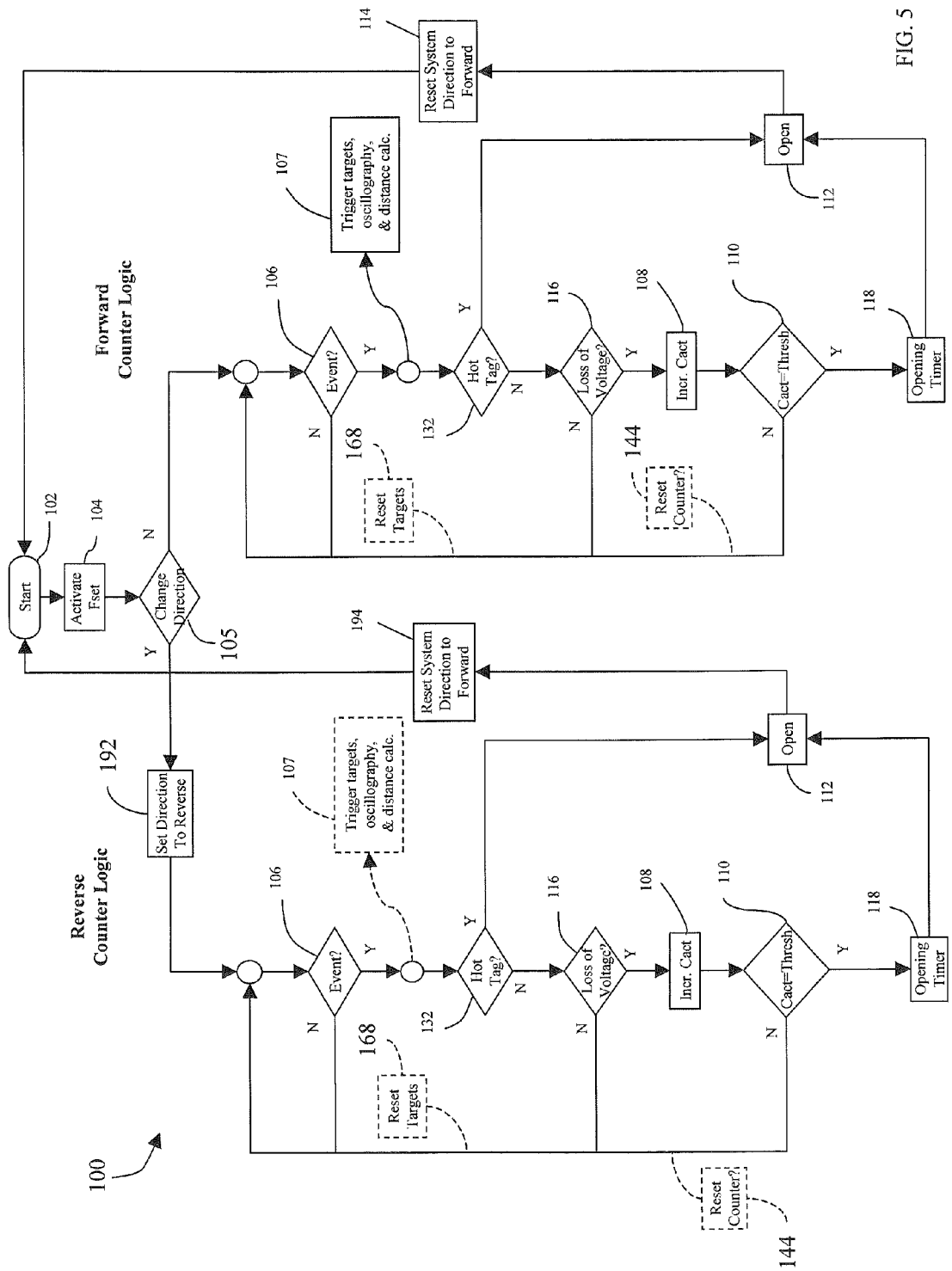
FIG. 5 is a flow chart illustration of an exemplary method of operating a recloser device on the autoloop system of FIG. 2.

An embodiment of an operation control method 100 is shown in FIG. 5 for a counter recloser. The process 100 starts in block 102 and activates a counter setting (Fset) in block 104. The forward counter setting (Fset) may be preset or may be user definable to allow utility personnel to adjust the operation of the counter recloser to provide the desired coordination with the other devices on the circuit. The process 100 then determines if the conditions for changing the counter direction are present in block 105.

Figure 6A:
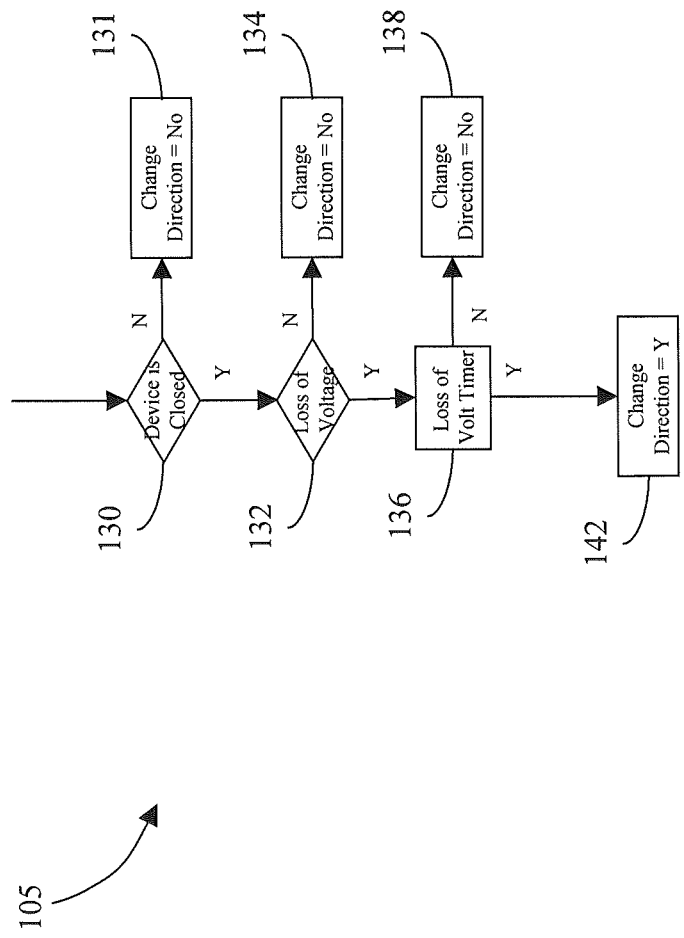
FIG. 6A is a flow chart of an embodiment of a method for determining which counter is being used (forward or reverse)

One embodiment of a method 105 of determining if the direction should be changed is shown in FIG. 6A. In this embodiment, it is determined in block 130 whether the device is closed. If the device is not closed, the method 105 returns a negative to process 100 via block 131. If the query block 130 returns a positive, meaning the device is closed, the method 105 proceeds to block 132 where a loss of voltage is determined. Query block 132 determines whether there is a loss of three phase voltage. If there is no loss of voltage, the method 105 returns a negative to process 100 via block 134. If the query block 132 returns a positive, meaning there is a loss of voltage, the method 105 proceeds to block 136 where a timer is initiated. If the voltage returns prior to the timer expiring, the method 105 returns a negative to process 100 via block 138. If the timer expires and the voltage has not returned, then the method 105 proceeds to block 142 where a change of direction is initiated. Once block 142 has changed direction, then the method 105 returns a positive to process 100 via block 142.

Referring back to FIG. 5, the query block 105 will return either a positive (reversal of counter) or a negative. If the query block 105 returns a negative, the device continues to operate with the forward counter logic and proceeds to block 106 to determine if an event, such as a short circuit fault for example, has occurred. If query block 106 returns a negative, the process 100 loops back and continues to monitor for an event. If query block 106 returns a positive, the process 100 to query block 116 where it is determined if the there was a loss of voltage. In one embodiment, the process 100 may also monitor or record trigger targets, oscillography and distance calculations in block 107 in parallel with query block 116.

In one embodiment, the counter recloser includes an optional feature, sometimes referred to as a "hot line tag", which assists in the protecting of electrical utility personnel who may be working on the electrical lines by directly tripping in response to a fault. The hot line tag is a manually or remotely settable switch 101 allows the removal of coordination configurations such that in the event of a fault, the device will open and lockout and cannot be closed again until the hot line tag switch is turned off. Thus, the hot line tag will override or bypass the counter logic. This feature may also provide advantages when utility personnel are working a dead line, so the field personnel know the electrical line cannot be energized again until the switch is turned off.

In embodiments incorporating an hot line tag, the process 100 proceeds to query block 132 where it is determined if the hot line tag switch has been activated. If the hot line tag switch has not been activated, and the query block 132 returns a positive and the process 132 proceeds to block 112 where the device is immediately opened to interrupt the flow of electrical power on the conductors.

If the hot line tag is not incorporated or if query block 132 returns a negative, the process 100 proceeds to block 116. If query block 116 returns a negative, the process 100 loops back to monitor for an event. If query block 116 returns a positive, the actual fault counter (Cact) is incremented in block 108. The process 100 then compares the actual fault counter (Cact) to the current active counter (e.g. Fset) in query block 110. If query block 110 returns a positive, meaning that the number of actual faults detected equals the maximum desired number, the process 100 proceeds to timer block 118 where a timer is initiated. Once the timer expires, the process 100 proceeds to block 112 to lock open counter recloser. The opening of the counter recloser prevents the flow of electrical current and isolates the fault. The counter recloser stays open until closed by utility personnel once the fault has been remedied. It should be appreciated that in some embodiments, the timer of block 118 may be set to zero to allow the counter recloser to immediately open upon the count equaling the threshold. Once the device is opened in block 112, if they have been enabled to do so. The process 100 then proceeds back to block 102.

Figure 6B:
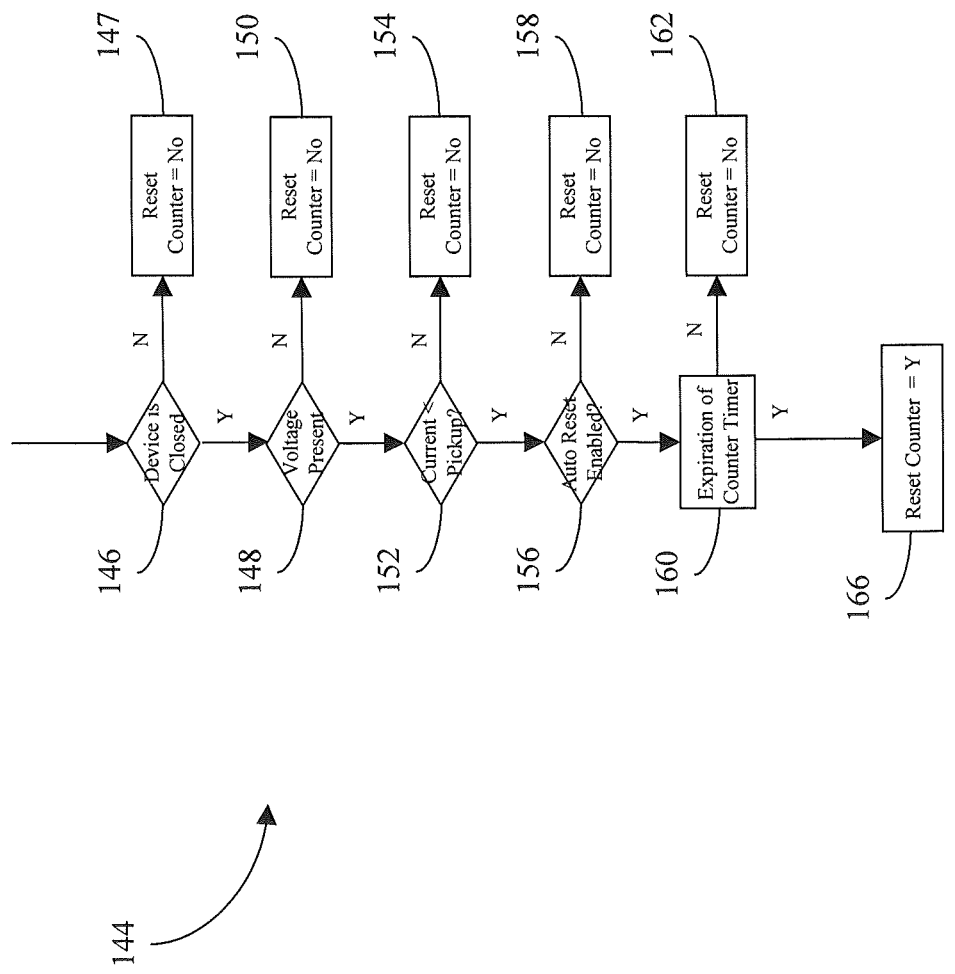
FIG. 6B-6D are flow chart illustrations of methods for automatically resetting parameters of the recloser device on the autoloop system of FIG. 2; and, FIG. 7 is a schematic illustration of a recloser device in accordance with an embodiment of the invention.

In some embodiments, the counter value (Cact) may be automatically reset upon the occurrence of predetermined conditions. Referring to FIG. 6B, one embodiment is shown for automatically reseting the counter value. In this embodiment, the method 144 determines if the counter recloser device is closed in query block 146. If the device is not closed, the method 144 returns a negative to process 100 via block 147. If the query block 146 returns a positive, meaning the device is closed, the method 144 proceeds to block 148 where a loss of voltage is determined. Query block 148 determines whether there is a loss of three phase voltage. If there is no voltage, then query block 148 returns a negative and the method 144 returns to process 100 via block 150. If block 148 returns a positive, the method 144 proceeds to query block 152 where it is determined if the current level on the electrical circuit is above a predetermined pickup threshold. If the current is below the threshold, the method 144 returns to process 100 via block 154 with no resetting of the counter value.

If query block 152 returns a negative, the method 144 proceeds to query block 156 where it is determined if the auto-reset function has been enabled. In some embodiments, the counter-recloser device may be coupled with communications, such as through a SCADA system. In these embodiments, the operators may desire to manually reset the counter values rather than having it occur automatically. In other embodiments, the counter recloser device may be operating autonomously. In these embodiments, the operator may desire to have the device automatically reset. If the auto-reset is enabled, the method 144 returns to process 100 via block 158 with no change to the counter value.

Figure 6C:
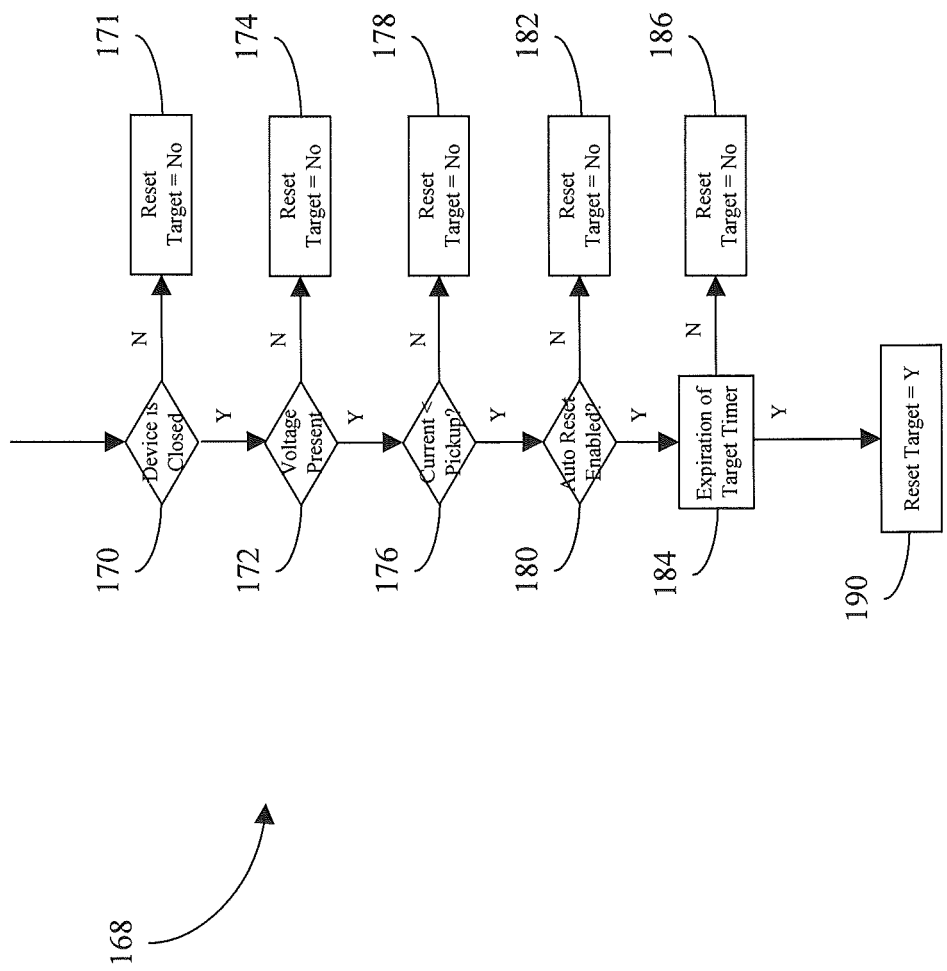

If query block 156 returns a positive, the method 144 proceeds to block 160 where a timer is initiated. The timer may be operator set for predetermined amount of time, such as 60 seconds for example. While the timer is operating, the method 144 continues to determine if the voltage is present or if the current is below a threshold. If there is a voltage loss or the current exceeds a threshold prior to the timer expiring, the method 144 returns to process 100 with no counter value reset via block 162. If the timer expires in block 160, the method 144 proceeds to logical block 166 where the reset counter function is initiated. Once block 166 has initiated, then (Cact) is reset in Block 166, Similar to the counter values, the target values/flags may also be reset. In some embodiments, the counter recloser device may have a so-called target or flag that is set when the device detects an event. In these embodiments, the target may include an alert light on the device, a signal may be transmitted via a communications system, or a flag may be set in software to alert the operators. These targets may be either manually or automatically reset based on operator settings. One embodiment shown in FIG. 6C illustrates one method 168 of automatically resetting the targets.

In this embodiment, the method 168 determines if the counter recloser device is closed in query block 170. If the device is not closed, the method 168 returns a negative to process 100 via block 171. If the query block 171 returns a positive, meaning the device is closed, the method 168 proceeds to block 172 where a loss of voltage is determined. Query block 172 determines whether there is a loss of three phase voltage. If there is no voltage, then query block 172 returns a negative and the method 168 returns to process 100 via block 174. If block 172 returns a positive, the method 168 proceeds to query block 176 where it is determined if the current level on the electrical circuit is above a predetermined pickup threshold. If the current is below the threshold, the method 168 returns to process 100 via block 178 with no resetting of the target.

If query block 176 returns a positive, the method 168 proceeds to query block 180 where it is determined if the auto-reset function has been enabled. In some embodiments, the counter-recloser device may be coupled with communications, such as through a SCADA system. In these embodiments, the operators may desire to manually reset the targets rather than having it occur automatically. In other embodiments, the counter recloser device may be operating autonomously. In these embodiments, the operator may desire to have the device automatically reset to avoid having a device showing a warning light for a long period of time after the event has occurred. If the auto-reset is enabled, the method 168 returns to process 100 via block 182 with no change to the counter value.

If query block 180 returns a positive, the method 168 proceeds to block 184 where a timer is initiated. The timer may be operator set for predetermined amount of time, such as 60 seconds for example. While the timer is operating, the method 168 continues to determine if the voltage is present or if the current is below a threshold. If there is a voltage loss or the current exceeds a threshold prior to the timer expiring, the method 168 returns to process 100 with no counter value reset via block 186. If the timer expires in block 184, the method 168 proceeds to logical block 190 where a reset target is initiated. Once block 190 has reset target, the logic will continue in method 100.

Referring back to FIG. 5, if the query block 105 returns a positive, meaning that a change of direction in the counter logic is desired, the process 100 proceeds to block 192 where the counter threshold is changed to the reverse counter threshold, and the actual reverse counter is set to zero. The process 100 then proceeds through blocks 106-112, 116, 118, 132, 144, 168 as described herein above with respect to the forward counter logic.

Figure 6D:
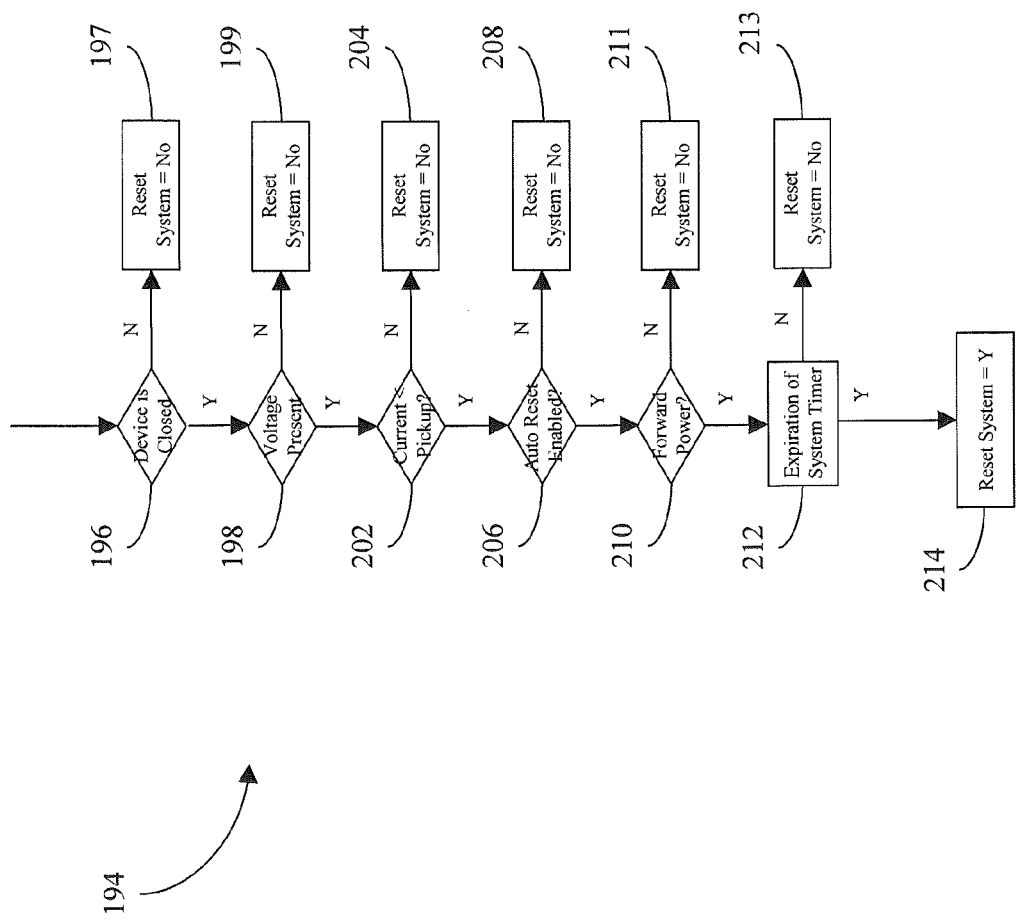

After the counter recloser device has been opened in block 112 in the reverse counter logic process, it may be reset either by manual intervention of the operator, or automatically in block 194. In some embodiments, the operator may desire for the counter recloser device to automatically reset. An embodiment is shown in FIG. 6D of a method 194 of automatically resetting the device. In this embodiment, the method 194 determines if the counter recloser device is closed in query block 196. If the device is not closed, the method 194 returns a negative to process 100 via block 197. If the query block 196 returns a positive, meaning the device is closed, the method 194 proceeds to block 198 where a loss of voltage is determined. Query block 198 determines whether there is a loss of three phase voltage. If there is no voltage, then query block 198 returns a negative and the method 194 returns to process 100 via block 200 and no resetting of the device is initiated. If block 198 returns a positive, the method 194 proceeds to query block 202 where it is determined if the current level on the electrical circuit is above a predetermined pickup threshold. If the current is below the threshold, the method 194 returns to process 100 via block 204 with no resetting of the device.

If query block 202 returns a positive, the method 194 proceeds to query block 206 where it is determined if the auto-reset function has been enabled. In some embodiments, the counter-recloser device may be coupled with communications, such as through a SCADA system. In this embodiment, the operators may desire to manually reset the device rather than having it occur automatically. In other embodiments, the counter recloser device may be operating autonomously. In these embodiments, the operator may desire to have the device automatically. If the auto-reset is enabled, the method 194 returns to process 100 via block 208 without the device being reset.

If query block 206 returns a positive, the method 194 proceeds to query block 210 where it is determined if the power flow is in the forward direction. If the power flow is in the reverse direction, the query block 210 returns a negative and the method 194 returns to process 100 via block 211 and no change in direction will be initiated.

If query block 210 returns a positive, the method 194 proceeds to block 212 where a timer is initiated. The timer may be operator set for predetermined amount of time, such as 60 seconds for example. While the timer is operating, the method 194 continues to determine if the voltage is present or if the current is below a threshold. If there is a voltage loss or the current exceeds a threshold prior to the timer expiring, the method 194 returns to process 100 without resetting the device. If the timer expires in block 212, the method 194 proceeds to 214 where a change of direction is initiated. Once block 214 has change direction back to the forward direction, the logic will continue in method 100.

In one embodiment, the counter functionality and the hot line tag functionality operate in parallel. In this embodiment, if the counter recloser experiences a loss of voltage when the hot line tag switch is activated, the timer would be initiated and the reverse counter setting (Rset) is activated. However, if the tie recloser closes and a fault is detected by the recloser, the recloser would immediately trip to the open position and lockout due to the hot line tag being active.

It should be appreciated that while embodiments herein describe the use of the reverse counter process in connection with a sectionalizing switch, the claimed invention should not be so limited and the processes described herein could be used with other electrical control devices, such as a motor operated disconnect for example. These devices may provide additional costs savings while still fulfilling the same isolation logic. Thus a simple sectionalizer or motor operated disconnect may be a less expensive alternative to buying a full tripping device, such as a recloser for example, and also handle complex auto-loop scenarios.

It should be appreciated that while embodiments herein refer to three-phase operation, a counter device may be a single phase device as well. Further, embodiments herein refer to operation in an auto-loop configuration, however, the counter devices may also be used in a radial (one direction) electrical network configuration as well.

It should also be appreciated that the counter device may utilized to track other parameters such as but not limited to trigger targets, oscillography and distance for example. This may provide advantages in allowing the counter device the ability to perform waveform analysis generate targets even though it may not have tripped yet. Therefore, for momentary faults where the counter does not reach its tripping logic, the device can still be used for fault location, oscillography and distance calculations. Further still, the counter device functionality may be blended with other network functions. For example, the logic can be a counter in one direction and another function in the other or it could have counters in both directions. Other feature can be into coordinated directions and non-coordinate, hot line tag override and switch mode for all aspects of day-to-day utility operations as well as over current in either forward or reverse directions and a loss of voltage isolation operation.

It should further be appreciated that the autoloop system and method of operation disclosed herein provides a number of advantages in reducing or minimizing the impact of an electrical fault in a distribution autoloop. The autoloop system and method may minimize the number of electrical loads and customers affected by an electrical fault in the distribution system by quickly and automatically isolating the affected segment and restoring electrical power to the other portions of the electrical circuit. The autoloop system and method may also provide advantages in allowing coordination among devices on an autoloop system without needing the transmission of communication signals between the devices. The counter has reset times for targets, counter and a global reset (handles resetting from reverse counter direction) to give the operator more flexibility to operate their system. For example, an operator may want the device to reset the counters at a different time than the targets for the way they handle their distribution automation procedures. Finally, embodiments of the invention may provide for a switch that allows counter reclosers to immediately open upon detecting a fault condition when utility personnel are performing operations on a downstream from the device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A device for interrupting a flow of electrical power in an electrical distribution system, the device comprising:
   a sensor operably coupled to the electrical distribution system, the sensor configured to generate a signal during operation in response to an electrical fault;
   a switching mechanism coupled to the electrical distribution system, the switching mechanism movable between an open position and a closed position;
   a controller operably coupled to the sensor and the switching mechanism, the controller having a processor that is responsive to executable computer instructions when executed on the processor incrementing a first counter in a first mode of operation and a second counter in a second mode of operation, wherein the current flows through the switching mechanism in a first direction in the first mode of operation and in a second opposing direction in the second mode of operation; and,
   wherein the processor is further responsive to executable computer instructions for switching from the first mode to the second mode in response to the signal from the sensor.

2. The device of claim 1 wherein:
   the signal is generated in response to detecting a predetermined electrical fault; and
   the processor is further responsive to executable computer instructions for incrementing the first counter in response to the detection of the predetermined electrical fault.

3. The device of claim 2 wherein the processor is further responsive to executable instructions for moving the switching mechanism from the closed position to the open position when the first counter equals a first threshold.

4. The device of claim 3 wherein the signal indicates a loss of voltage on the electrical distribution system.

5. The device of claim 4 wherein the processor is further responsive to executable instructions for incrementing the second counter in response to the detecting of the predetermined electrical fault.

6. The device of claim 5 wherein the processor is further responsive to executable instructions for moving the switching mechanism from the closed position to the open position when the second counter equals a second threshold.

7. The device of claim 6 wherein the first threshold and the second threshold are user definable.

8. The device of claim 1 wherein the device is configured to operate autonomously from other devices on the electrical distribution system.

9. An autonomous device for interrupting a flow of electrical power in an electrical distribution system, the device comprising:
   a sensor operably coupled to the electrical distribution system;
   a switching mechanism coupled to the electrical distribution system, the switching mechanism movable between an open position and a closed position;
   a user selectable switch, the user selectable switch being movable between a first position and a second position;
   a controller operably coupled to the sensor, the switching mechanism and the user selectable switch, the controller having a processor that is responsive to executable computer instructions when executed on the processor incrementing a first counter in a first mode of operation and a second counter in a second mode of operation;

wherein the processor is further responsive to executable computer instructions for switching from the first mode to the second mode in response to a signal from the sensor; and, wherein when the user selectable switch is in the second position, the processor is further responsive to executable computer instructions for moving the switching mechanism from the closed position to the open position in response to a detection of a fault condition on the electrical distribution system.

10. The device of claim 9 wherein the processor is further responsive to executable computer instructions for receiving a signal from the sensor and response to detecting a predetermined electrical fault and incrementing the first counter in response to the detection of the predetermined electrical fault.

11. The device of claim 10 wherein the processor is further responsive to executable instructions for moving the switching mechanism from the closed position to the open position when the first counter equals a first threshold.

12. The device of claim 11 wherein the signal indicates a loss of voltage on the electrical distribution system.

13. The device of claim 12 wherein the processor is further responsive to executable instructions for incrementing the second counter in response to the detecting of the predetermined electrical fault.

14. The device of claim 13 wherein the processor is further responsive to executable instructions for moving the switching mechanism from the closed position to the open position when the second counter equals a second threshold.

15. A method of operating a recloser device on an electrical distribution network, the method comprising:
activating a first counter setting;
monitoring the electrical distribution network;
detecting a first electrical fault on the electrical distribution network;
incrementing the first counter in response to detecting the first electrical fault;
determining when the first counter is equal to the first counter setting;
opening a switching mechanism when the first counter is equal to the first counter setting;
detecting a loss of voltage on the electrical distribution network; and,
activating a second counter setting in response to the detecting of the loss of voltage.

16. The method of claim 15 further comprising setting the first counter to zero after a first predetermined time period.

17. The method of claim 16 further comprising:
detecting a second electrical fault; and,
incrementing the second counter in response to detecting the second electrical fault.

18. The method of claim 17 further comprising:
determining if the second counter is equal to the second counter setting; and,
opening the switching mechanism when the second counter is equal to the second counter setting.

19. The method of claim 15 further comprising providing a user selectable switch that is movable between a first position and a second position.

20. The method of claim 19 further comprising opening the switching mechanism when the user selectable switch is in the second position and the first electrical fault is detected.

* * * * *